(12) United States Patent
Secor (10) Patent No.: US 9,074,917 B2
(45) Date of Patent: Jul. 7, 2015

(54) APPARATUS FOR MEASUREMENT OF DUCTED AIR

(71) Applicant: Russell P Secor, Phoenix, AZ (US)

(72) Inventor: Russell P Secor, Phoenix, AZ (US)

( * ) Notice: Subject to any disclaimer, the term of this patent is extended or adjusted under 35 U.S.C. 154(b) by 40 days.

(21) Appl. No.: 14/077,118

(22) Filed: Nov. 11, 2013

(65) Prior Publication Data

US 2014/0208869 A1    Jul. 31, 2014

Related U.S. Application Data

(63) Continuation of application No. 13/317,498, filed on Oct. 19, 2011, now Pat. No. 8,578,790, and a continuation-in-part of application No. 13/136,814, filed on Aug. 11, 2011.

(60) Provisional application No. 61/463,549, filed on Feb. 19, 2011, provisional application No. 61/401,336, filed on Aug. 11, 2010, provisional application No. 61/463,549, filed on Feb. 19, 2011.

(51) Int. Cl.
*G01F 1/46*    (2006.01)
*G01F 1/34*    (2006.01)

(52) U.S. Cl.
CPC ... *G01F 1/46* (2013.01); *G01F 1/34* (2013.01)

(58) Field of Classification Search
CPC .............. G01F 1/34; G01F 1/46; G01W 1/00; F16K 31/02
USPC ................... 73/861.65, 861.42, 717, 170.26; 128/204.23
See application file for complete search history.

(56) References Cited

U.S. PATENT DOCUMENTS 4,444,201 A * 4/1984 Itoh .............................. 600/529
6,430,996 B1 * 8/2002 Anderson et al. .......... 73/170.26
8,578,790 B2 * 11/2013 Secor ......................... 73/861.65

* cited by examiner

*Primary Examiner* — Jewel V Thompson
(74) *Attorney, Agent, or Firm* — Donald J. Lenkszus (57) ABSTRACT

Apparatus and methods for measurement of airflow in a duct are described. The apparatus combines a Pitot tube, sensing apparatus, control apparatus, a display, control switches and carry apparatus arranged into a unitary structure.

26 Claims, 12 Drawing Sheets

| FPM | 325 | 308 Avg<br>333 Max<br>265 Min | 70.0 °F<br>50.0 %RH<br>28.8 Hg |
|---|---|---|---|
| inW | 1.23 | 1.26 Avg<br>1.32 Max<br>1.21 Min | 0.15 Acf<br>1.00 ft |
| AA | 12 | | 325 CFM |

FIG. 8B

| Length | Width | | |
|---|---|---|---|
| 12.0 | 12.0 | 325 | |
| IN | DEF | FPM | |
| | 1.00 | 325 | |
| | FT² DEF | CFM | |

FIG. 8C

Group AA      7/14/11

| Rec | Time Stamp | FPM | inW |
|---|---|---|---|
| 1 | 13:48:30 | 325 | 1.23 |
| 2 | 13:48:49 | 333 | 1.21 |
| 3 | 13:49:12 | 310 | 1.32 |
| ↓ 4 | 13:49:35 | 265 | 1.27 |

1201 Place System 200 in Continuous Mode

1203 Insert Pitot Tube Into Duct Against Far Wall

1205 Initiate Continuous Reading

1207 Move Tube at Continuous Rate

1209 Display Results

FIG. 12

APPARATUS FOR MEASUREMENT OF DUCTED AIR

RELATED APPLICATIONS

This application is a continuation of and claims the benefit of application Ser. No. 13/317,498 filed on Oct. 19, 2011, which claims the benefit of Provisional Patent Application No. 61/463,549, filed Feb. 19, 2011, titled System of Wireless Sensors with Wearable Controller.

Application Ser. No. 13/317,498 also claims the benefit of and is a continuation-in-part of my prior application Ser. No. 13/136,814 filed on Aug. 11, 2011 that claims the benefit of Provisional Patent Application Ser. No. 61/401,336, filed Aug. 11, 2010, entitled Wearable Wireless Instrument System; and that also claims the benefit of Provisional Patent Application Ser. No. 61/463,549, filed Feb. 19, 2011, entitled System of Wireless Sensors with Wearable Controller. The disclosures of those prior applications are incorporated herein by reference.

FIELD

The present invention relates to measurement instruments, in general, and to apparatus for performing measurements on airflow inside a duct, in particular.

BACKGROUND

Measurement problems are important to the HVAC industry. Measurement disputes are often at the heart of conflicts over HVAC performance issues such as uncomfortable buildings, inefficient energy performance, and inability to maintain specified parameters such as adequate positive pressure in hospital operating rooms. These conflicts frequently result in anger, confusion, disputes, cancelled contracts, lawsuits, mediation, and unhappy building owners, tenants, and workers. Contributing to these conflicts is that measurements of HVAC-related building parameters such as air and water temperature, humidity, pressure, velocity, and flow are perceived to be inaccurate and unreliable, so dissatisfied parties often challenge their validity.

Fans create pressure differences, which force air to flow through the duct system of a building. Fans in the air handling unit (AHU) generate the energy necessary to overcome the duct system's resistance to airflow. Resistance is offered by filters and heat exchange coils. Straight ducts have resistance in proportion to their length. Bends and size changes increase resistance to flow. Diffusers (grilles, outlets) offer the final resistance before the air reaches the occupied spaces of a building. After exposure to humans and machines, the stale, warm, humid air faces additional resistance as it is pulled back to the AHU through the return air duct system.

HVAC engineers specify the critical parameters of a building's duct system, including the range of airflow volume, temperature, humidity, and pressure that must be present at each point in the system. Air balancers must verify that the HVAC system meets the specifications. They measure the state of the system as installed, issue corrective action requests as necessary, and then tune the system to achieve optimum comfort and energy efficiency within the range of conditions specified.

Air balancers must measure critical air parameters at many key places throughout the building's duct system, including right at the AHU, in the main duct, at the entrance to key branch ducts, such as the ducts feeding each floor of a building, and in the various ducts supplying diffusers in the occupied spaces. The measured air volumes are collected and compared and analyzed in charts to account for every CFM (cubic feet per minute) of air generated by the fan. Leaks are detected and fixed. Rotational speeds (RPM) of fans are adjusted. Valves, dampers, and grilles are adjusted.

Flow and airflow are industry terms that relate to the volumetric rate of fluid flow expressed in units such as cubic feet per minute (CFM). Airflow is usually not measured directly. It is usually calculated by measuring the velocity of air at multiple points in a cross-sectional plane, calculating an average velocity at the plane, and then multiplying by the known area of the cross-section. The plane where measurement takes place might be across an air duct, in a duct-shaped probe like a capture hood, or at the opening of a fume hood, door, or window.

A velocity traverse or "duct traverse" is one of the most complicated and arduous procedure in the air balancing field.

A "duct traverse" is a series of measurements at a particular point in a duct to determine the air volume in cubic feet per minute ("CFM") and the air velocity profile in feet per minute ("FPM"). It is usually desirable that additional parameters be measured at the same location, including the static pressure, which is the pressure between the air inside the duct and the pressure in the building, and air temperature (dry bulb). Sometimes air moisture content is also measured, in terms of wet bulb temperature or dew point or percent relative humidity or grains of water per cubic foot.

The term "traverse" as used herein means the measurement of every parameter of interest at a particular duct location.

Not only are traverses required in multiple locations of a building, traverses are often required to be performed multiple times over days or weeks at the same location, because the duct system must be tested under various conditions. Nighttime conditions are controlled differently from daytime conditions. Seasons vary and the load of temperature and humidity stress on the building varies. There are often fire and/or smoke control modes with special duct requirements. These requirements mean that duct traverses are among the most frequently performed procedures of air balancing.

Measurement tools and techniques have changed very little in the last century. A Pitot tube is still the velocity probe of choice. The Pitot tube is actually two tubes within a probe shaft that conduct two different air pressures from one end to the other. There are two orifices on one end and two ports on the other end. When the tip of a Pitot tube is properly oriented with its tip facing the direction of airflow, the air colliding with the tip causes Total Pressure, while the air moving parallel to the shaft causes Static Pressure. The mathematical difference between Total Pressure and Static Pressure is called Velocity Pressure. If Velocity Pressure is known, along with temperature and barometric pressure, which determine the density of air, then the following popular equation, derived from fundamental laws of physics, provides the precise velocity of the moving air:

$V=1096.7 \times$ square root of $(VP/d)$, where:

V is velocity in feet per minute

VP is velocity pressure in inches of water column d is density of air in pounds per cubic foot=$1.325 \times BP/T$, where:

BP is barometric pressure in inches of mercury

T is absolute temperature=degrees Fahrenheit+460

A Pitot tube that comprises two tubes, one to conduct total pressure and the other to conduct static pressure is also referred to as a "Pitot-static tube". The term "Pitot tube" as used herein is intended to be inclusive of the so-called "Pitot-static tube."

Some velocity probes are based on differential pressure like the 400-year-old Pitot tube, but they have "lee side" orifices instead of static pressure orifices, so the differential pressure generated is not the same as traditional velocity pressure. However, velocity can still be calculated using the equation above, with only the addition of a constant factor K that can be empirically determined such that the equation becomes:

$$V = K \times 1096.7 \times \text{square root of } (VP/d).$$

A duct traverse is performed as follows. A technician first measures the length and width of a rectangular duct, or the diameter of a round duct, and calculates the cross-sectional area, adjusting for the thickness of the duct walls and any insulation or other internal obstructions. Then he consults a table provided by an engineering society, such as ASHRAE, for the locations of the points in a matrix on the duct cross-sectional plane at which air velocity must be known in order to make an accurate calculation of average air velocity. The technician drills holes in the duct to allow the Pitot tube to be positioned at the each point in the matrix. It is convenient to think about horizontal and vertical planes across the duct. The technician marks his probe with tape so he can see how far into the duct to insert it to reach each traverse point.

To perform the measurements in a typical non-residential site, the technician usually has to stand on a high ladder, with his head above the ceiling tiles, and balance precariously while manipulating tools in both outstretched hands. In one hand is the meter. Connected to the meter with tubes is a Pitot tube probe, which is inserted into the duct and placed at the point of interest. Holding the Pitot tube as steady as possible, the technician pushes a button on the meter to make a measurement. Then the technician moves the Pitot tube probe to the next point and makes another measurement. The technician must manipulate the meter with one hand to press the control keys while manipulating the Pitot tube with the other hand and keeping the tubes from swinging and getting tangled.

The technician then makes a velocity measurement at each traverse point, one after the other, recording or storing each reading as he goes. Usually, between 16 and 100 measurements are required, depending on the size of the duct, each one taking a few seconds or several seconds. When each point in the matrix has been measured, the Pitot tube is withdraw from the duct. The temperature and/or humidity probe is withdrawn from the duct. The holes are plugged to prevent air leaking out. The average of all measurements is recorded as the average velocity at that duct cross-section. When multiplied by the cross-sectional area, the volumetric airflow is determined.

After the traverse measurements, the technician must measure the static pressure in the duct at that location. Traditional instruments will not allow static pressure to be measured with the same setup as velocity. The technician must remove the Pitot tube from the duct, change the air hose attachments, and change the mode on the meter. The technician then re-inserts the Pitot tube, or a different probe for measuring static pressure, back into the duct. A series of measurements are made to determine the most representative static pressure at that location, and it is noted.

Beyond the basic set-up procedures of determining duct size, determining matrix points, and drilling duct holes, these steps are required: attach temperature probe to meter, set meter to temperature mode, insert temperature probe in duct, measure temperature, change meter mode to velocity, attach pressure tubes to meter and Pitot tube, insert Pitot tube into duct, measure velocity at traverse points and store data in memory for review and statistics, withdraw Pitot tube from duct, change tubes at meter and at Pitot tube for static pressure, change meter mode to static pressure, insert Pitot tube into duct, measure static pressure, remove Pitot tube from duct.

There are well known problems with the duct traverse procedure including, but not limited to the time consuming nature of performing the measurements; the precarious manner in which the measurements are made; and the multiple steps required.

Conventional commercially available instruments are designed to measure and display only one parameter at a time, and require regular manual operation to even do that. A typical hand-held meter or instrument comprises a plastic case enclosing a printed circuit board with microprocessor-controlled electronics, memory, one or more sensors, and a display. A sensing probe is connected using cables, wires, tubes, or other means. Various probes, large and small, are designed to collect environmental samples for sensing, measurement, display, and storage. The user often must wait between 2 and 8 seconds for the meter to generate a reading. The reading is then displayed by the meter and the user can either write it down or store it in the memory of the meter. All of this is required to determine the velocity at a single point in the duct.

Foil types of velocity probes are sometimes preferred because they are easier to insert through a hole into the duct, not having the bend of the traditional Pitot tube. Unlike Pitot tubes, foil-type probes can also measure negative velocity, the velocity of air moving in the opposite direction due to eddies near duct discontinuities. However, the foil-type of probe has a lee-side orifice instead of a true static pressure orifice, so the static pressure measurement of a complete traverse requires the replacement of the velocity probe with a traditional static pressure probe, known as a "static tip". This requires time and limits the productivity of the technician, who may decide to skip the measurement or estimate the static pressure.

A problem of conventional practice is that the traverse measurements stored in the conventional meter are required at a different physical location. Conventional practice is for the meter to be brought to a table where the stored data is either transferred manually to a computer or report form, or the data is loaded electronically into a personal computer for subsequent report generation.

Typical meters are generally so large and heavy that they require a technician to devote a hand to hold them and another hand to press control keys. With difficulty, a technician learns to hold an instrument in his palm while fingering the keys with the thumb of the same hand. That hand is not available to steady or brace the technician who stands in a precarious situation. Accordingly, there is a need for instruments that are small and light and able to be mounted and supported without requiring a human hand and arm.

Airflow meters provide low velocity accuracy. Typical accuracies are specified as 3%+/−7 fpm. A reading of 500 FPM could really be 478 to 522. But at 100 FPM, the velocity could really be 90 or 110, and at 50 FPM, the velocity could really be 41.5 or 58.5. That not considered accurate enough.

Measurements may be inaccurate for several reasons that are independent of metering accuracy. More specifically, accuracy is lost when physical stress causes the technician to inadvertently move the velocity probe during measurement or hold the probe in the wrong location; accuracy is lost when the long, dangling rubber hoses between the instrument and the probe are allowed to swing, causing waves that affect the pressure sensors; accuracy is lost when the technician rushes through the process, taking too few velocity measurements or taking other shortcuts; and accuracy is lost when duct air temperature is often ignored due to the difficulty and time required to place and hold the temperature probe for a proper measurement. The typical probe is attached to the meter via a coiled cable.

Accuracy is also lost when the velocity profile is not uniform enough to meet industry standards. The industry-prescribed matrix locations were developed over many years and much research to ensure an accurate result of traverses. Industry standards forbid the performance of a traverse in areas where fans, dampers, louvers, duct bends, or other discontinuities, cause air turbulence and uneven airflow. In the proscribed sections of duct, air eddies and reverse currents can exist. Velocity traverses in these areas, if conducted on the standard matrix, will not be accurate. It is necessary that air passing through such discontinuities be allowed to even out over many feet of straight duct, after which a typical velocity profile is achieved. However, the reality is that architects and engineers are not required to provide such a proper location for a duct traverse, and they often cannot be found. In these cases technicians are forced to measure at the undesirable profile point. The accuracy of the average velocity calculated would be improved if the number of measurement points in the matrix were increased substantially. Current industry standards allow that—specifications are for the minimum number of readings. However, technicians are reluctant to do that because the procedure is already so time-consuming.

SUMMARY

In accordance with an embodiment, handheld measuring apparatus is provided comprising an air velocity probe; and a handle affixed to the air velocity probe, the handle configured such that the air velocity tube is graspable in a single hand for taking measurements in an airstream.

Pressure sensing apparatus is coupled to the air velocity probe and carried by the handle, the air velocity probe, the handle and the pressure sensing apparatus comprising a unitary apparatus configured to be held in a single hand.

The unitary apparatus further comprises a microcontroller coupled to the pressure sensing apparatus.

Display apparatus in communication with the pressure sensing apparatus to display the measurements is provided in an embodiment. The display apparatus is coupled to the microcontroller for displaying the measurements. The display apparatus is carried by the handle and comprises a portion of the unitary apparatus. In at least one embodiment, the display is adjustable for viewing. Movable apparatus is coupled to the handle and supporting the display.

A memory is provided for storing the measurements.

In various embodiments, one or more switches are carried by the handle to control operation of the apparatus.

In a preferred embodiment, the air velocity probe comprises a Pitot tube. The air velocity tube comprises a total pressure outlet and a static pressure outlet.

The pressure sensing apparatus comprises: one or more solid state pressure sensors; and a selectively operable valve arrangement coupled to the air velocity probe and to the one or more solid state pressure sensors. A microcontroller is coupled to the pressure sensing apparatus and to the selectively operable valve arrangement for controlling operation of the apparatus. The selectively operable valve arrangement comprises a plurality of selectively operable valves coupled to one or more pressure sensors.

In an embodiment, apparatus is provided to measure velocity pressure and static pressure in air handling systems. The apparatus comprises: a Pitot tube for insertion into a duct. The Pitot tube comprises a total pressure tube having a total pressure tube outlet, and a static tube having a static tube outlet. A sensing module is provided having a first inlet coupled to the Pitot tube total pressure outlet and a second inlet coupled to the static tube outlet. The sensing module is operable to concurrently measure air velocity pressure and air static pressure in the duct. The apparatus further comprises a handle carrying the Pitot tube and the sensing module. The Pitot tube, the sensing module and the handle are arranged to provide a measuring unit holdable and operable in one hand. The sensing module comprises first and second solid state differential pressure sensors. The sensing module comprises valving apparatus disposed between the first and second inlets and the first and second solid state differential pressure sensors. The sensing module comprises a processor in communication with the pressure sensors and operable to control the valving arrangement.

One embodiment comprises a control and display module; and the sensing module is in communication with the control and display module.

In an embodiment, a display is carried by the handle to display measurements and the display is positionally adjustable.

In various embodiments one or more switches are carried by the handle for controlling operation of the apparatus.

In various embodiments, the sensing module comprises first and second solid state differential pressure sensors. The sensing module comprises valving apparatus disposed between the first and second inlets and the first and second solid state differential pressure sensors. The sensing module comprises a processor in communication with the pressure sensors and operable to control the valving apparatus. The sensing module is in communication with a control and display module.

The sensor module and the control and display module are cooperatively operative to automatically concurrently measure air velocity pressure and air static pressure at predetermined time intervals. The time intervals are selected to provide a duct traverse.

In yet a further embodiment, apparatus is provided to measure velocity pressure and static pressure in air handling systems, the apparatus comprises: a Pitot tube for insertion into a duct, the Pitot tube comprising a total pressure tube having a total pressure tube outlet, and a static tube having a static tube outlet; a module having a first inlet coupled to the Pitot tube outlet and a second inlet coupled to the static tube outlet, the module operable to concurrently measure air velocity pressure and air static pressure in the duct, the module comprising a display to display measurement data; and a handle carrying the Pitot tube and the module. The Pitot tube, the module and the handle arranged to provide a measuring unit holdable and operable in one hand with the display viewable by a user of the apparatus.

The module comprises at least one processor to perform predetermined calculations utilizing pressure measurements received at the first and second inlets. The module comprises a memory; and the processor stores calculated results in the memory.

The apparatus further comprises a display; and the processor is operable to display predetermined ones of the calculated results on the display.

The module is operative to automatically concurrently measure air velocity pressure and air static pressure at predetermined time intervals. The time intervals are selected to provide a duct traverse

BRIEF DESCRIPTION OF THE DRAWING

The invention will be better understood from a reading of the following detailed description taken in conjunction with the drawing figures in which like designators are used to identify like elements, and in which the various drawing elements are not drawn to scale, and in which.

DETAILED DESCRIPTION

Figure 1:
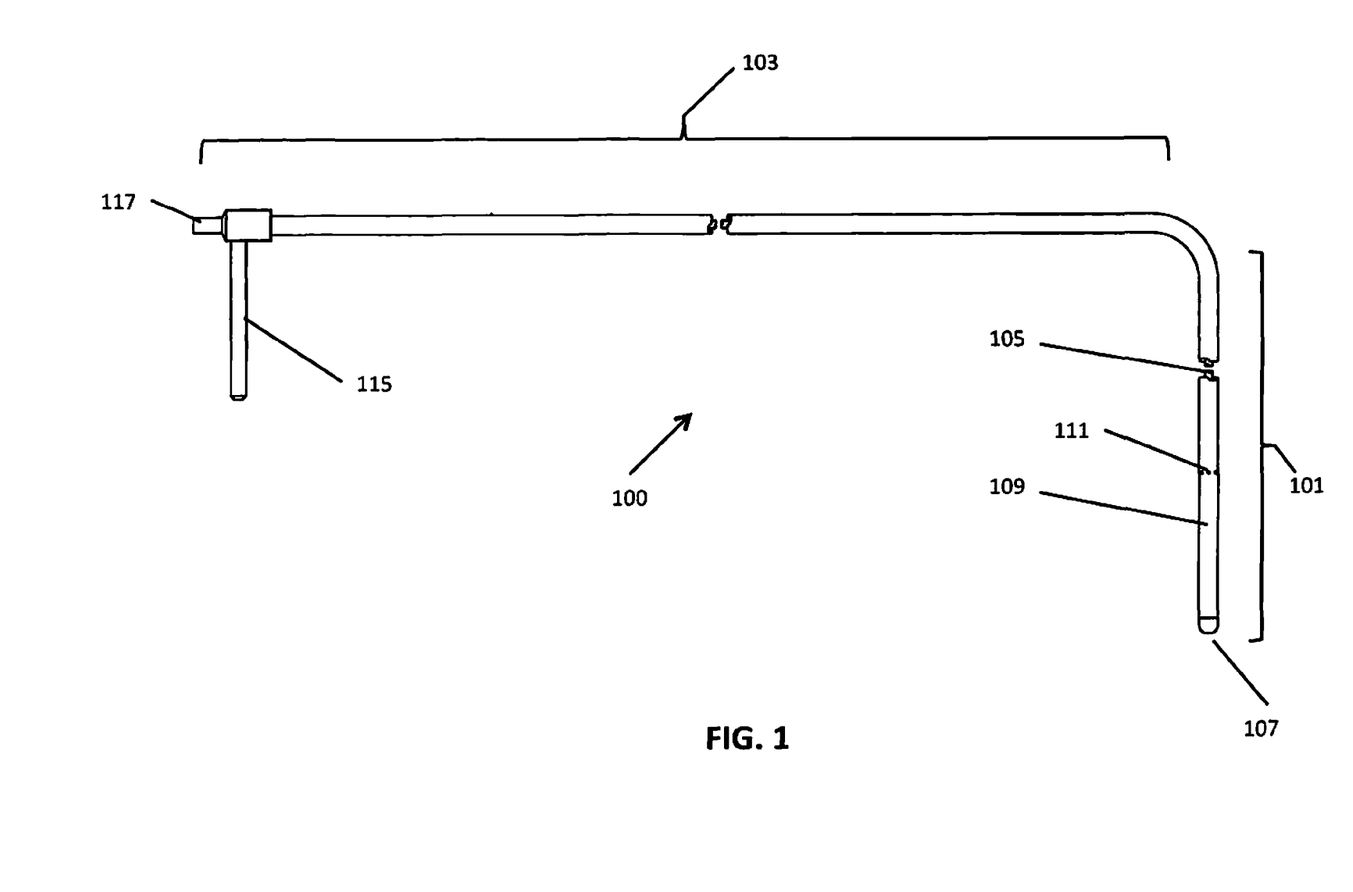
FIG. 1 illustrates a prior art Pitot tube.

FIG. 1 shows a prior art Pitot tube 100. Pitot tube 100 includes portion 101 that is oriented to be in an airflow, and a main shaft portion 103 that is extended into the airflow. Pitot tube 100 comprises a total pressure Pitot tube 105 and a static pressure tube 109. Total pressure tube 105 includes an aperture disposed at end 107 of Pitot tube 100 and a total pressure outlet 117 at its other end. Static pressure tube 109 comprises one or more apertures 111 disposed on Pitot tube end portion 101 and terminates in a static pressure outlet 115.

Figure 2:
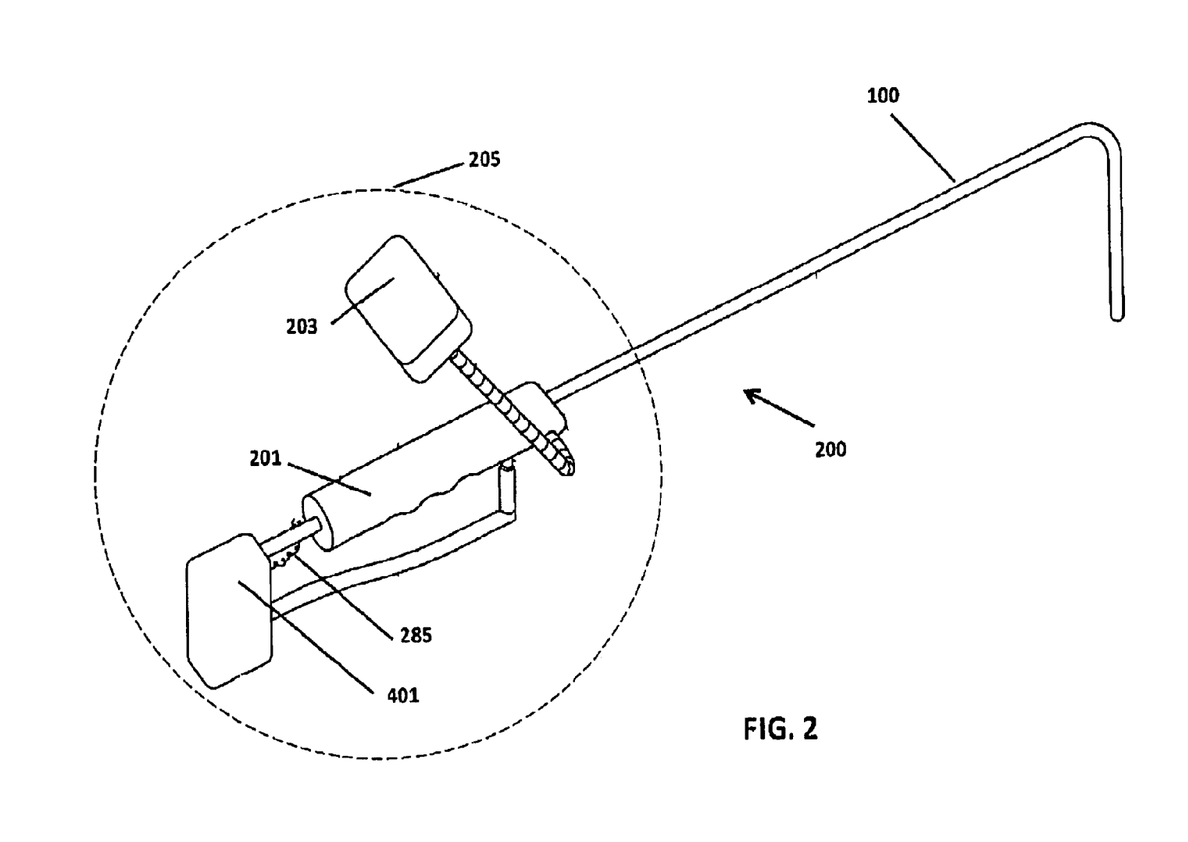
FIG. 2 is an isometric view of an embodiment in accordance with the principles of the invention.

Turning now to FIG. 2, a first embodiment of a structure 200 including Pitot tube 100 is shown. Pitot tube 100 is provided with a handle 201 that permits Pitot tube 100 to be more easily manipulated in an airflow such as that in a duct. Handle 201 carries Pitot tube 100, a velocity sensing module 401 and a control and display module 203.

Structure 200 permits one to advantageously perform a velocity traverse while using only one hand, allowing the other hand to be available for holding another tool or for grasping a fixed object for bracing and safety.

Figure 3:
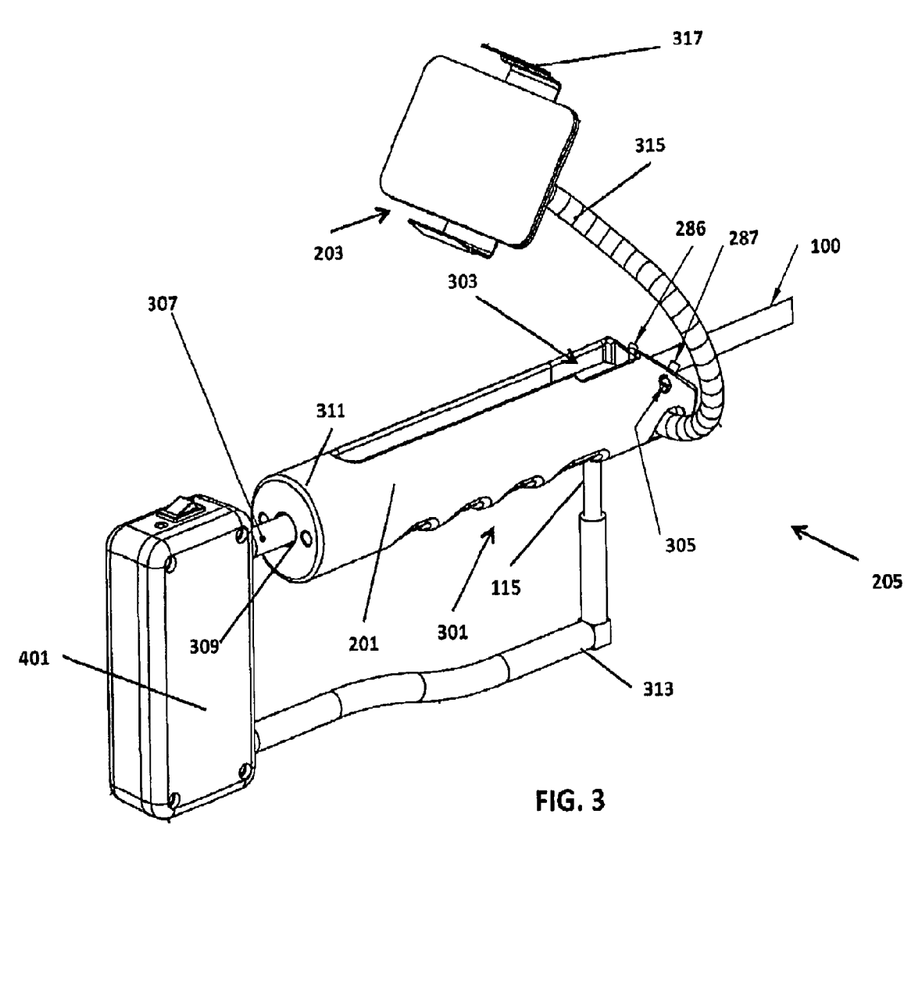
FIG. 3 illustrates a portion of the embodiment of FIG. 2 in greater detail.
Figure 4:
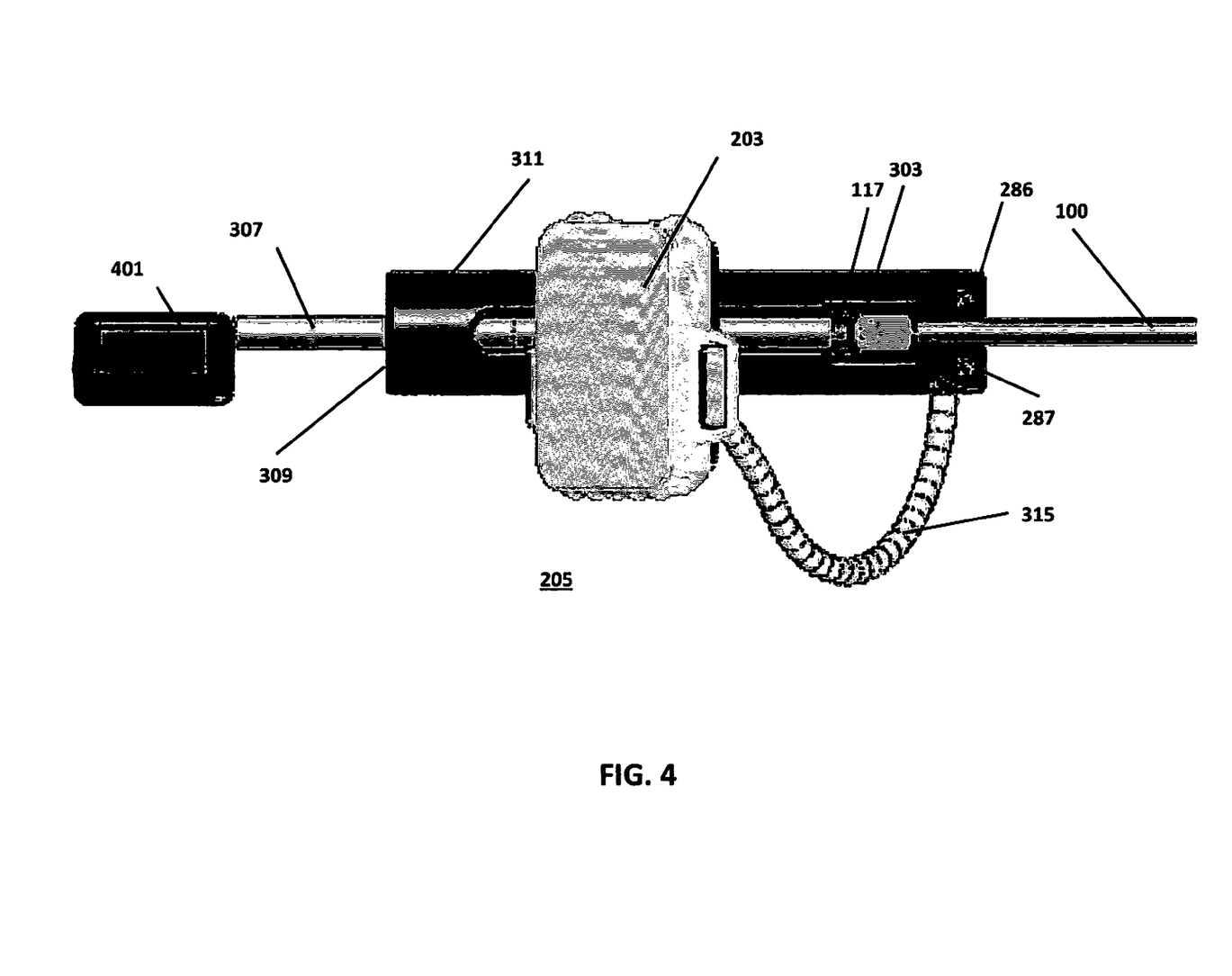
FIG. 4 is a top view of the portion shown in FIG. 3.
Figure 5:
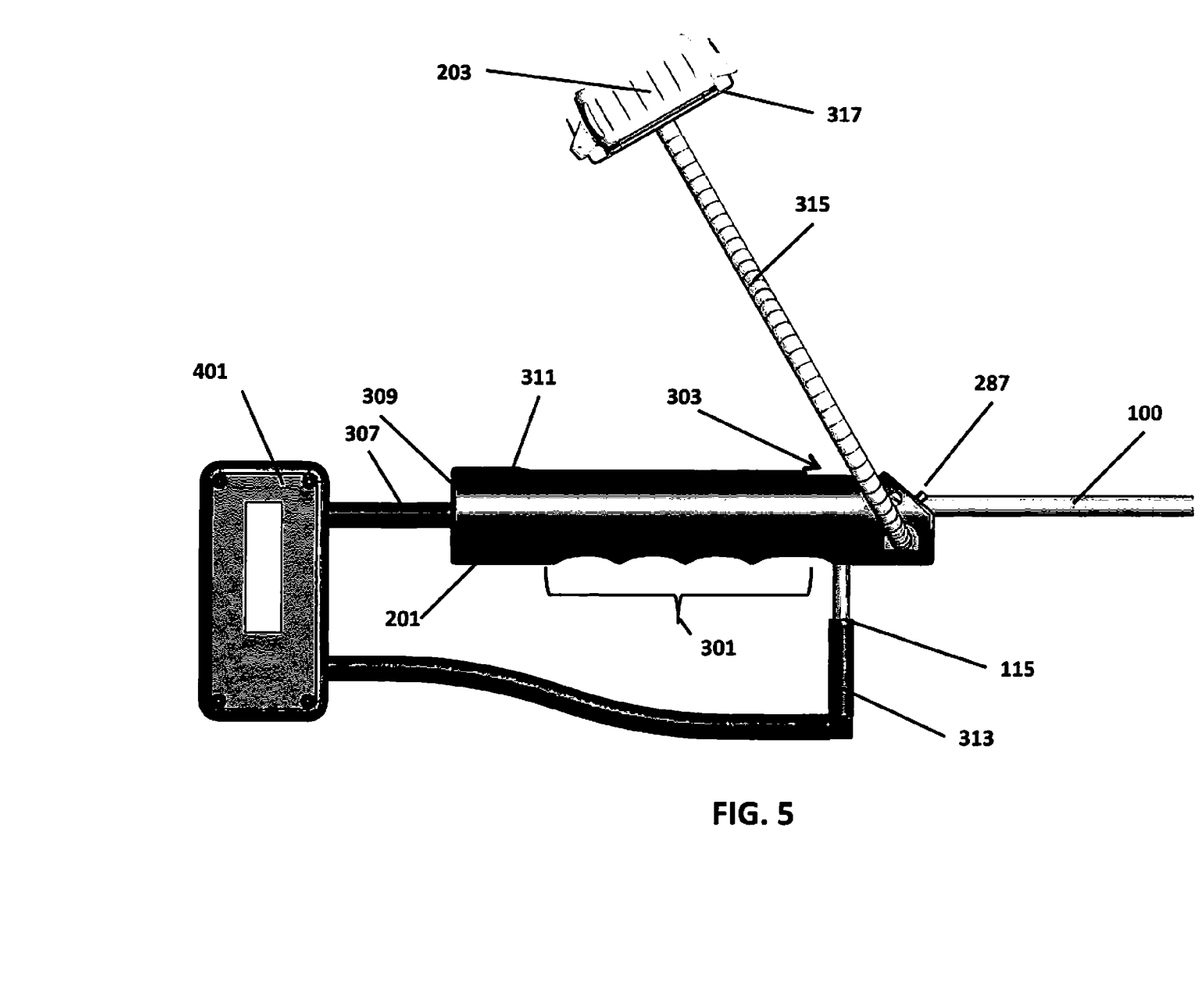
FIG. 5 is a side view of the portion shown in FIG. 3.

FIGS. 3, 4 and 5 illustrates the handle portion 205 of structure 200 in greater detail. FIG. 3 illustrates the handle portion 205 without control and display module 203 to permit details of apparatus 317 that retains control and display module 203 to be easily seen.

Handle 201 in the embodiment shown is machined from a single block of nylon with several appropriate features. Handle 201 has its outer surface 301 shaped to conform to a human hand in similar fashion as a bicycle handle bar grip. Handle 201 includes a slot 303 into which a Pitot tube 100 can be inserted such that main shaft portion 103 is held tightly. Handle 201 has a hole that is not shown that extends from the bottom of slot 303 through which static pressure output tube outlet 115 extends, providing axial and rotational control of Pitot tube 100. A spring bearing 305 is carried by handle 201 and when Pitot tube 100 has been pressed down into slot 303, spring bearing 93 presses tightly against the top of Pitot tube 100, retaining it in slot 303.

Total pressure outlet 117 lays in slot 303, where it is connected to a semi-flexible tubing connector 307. Semi-flexible tubing connector 307 extends in slot 303 and through a hole 309 in end 311 of handle 201 to a total pressure inlet port 403 of velocity sensing module 401. Static pressure output port 115 of Pitot tube 100 is connected by a semi-flexible tube 313 to the static pressure inlet port 405 of velocity sensing module 401. Tubes 307, 313 are fashioned of a material such as neoprene rubber which are easily and commonly installed and uninstalled on Pitot tubes and similar probes in the field. Tubes 307, 313, while being somewhat flexible, are stiff enough that velocity sensing module 401 does not move during measurement.

Structure 200 supports the vast majority of existing Pitot tubes and foil-type probes. Such probes vary greatly in length, but the dimensions of the main shaft portions 103, static pressure outlet ports 115, and total pressure outlet ports 117 are virtually identical, such that structure 200 is adapted to securely carry such Pitot tubes and foil-type probes.

Control module 203 is mounted on flexible support arm 315. Support arm 315 is a gooseneck type of support tube in the embodiment and includes a clip retainer 317 to retain control module 203. Control module 203 may include a display and may be moved as desired so that the display faces the user such that measurement results can be viewed by the user without moving his head from the task of positioning Pitot tube 100.

Handle 201 carries contact switches 286 and 287. Contact switches 286, 287 have electrical leads that exit the nylon handle in cable 285 and connect to velocity sensing module 401. Contact switches 286 and 287 are in a position to be pressed and activated by a user's thumb to input commands to control module 203 for actions such as mode, view, and storing of readings. Velocity sensing module 401 detects a operation of contact switches 286, 287 and transmits commands to control module 203 for execution. This avoids the necessity for the user to move a hand and/or arm to touch a keypad on control module 203.

A user may require two hands to make the connections in structure 200 and set control module 203 to a selected appropriate mode. However, during performance of a duct velocity traverse, one hand will suffice to execute a proper traverse and collect accurate results of all desired parameters by utilizing contact switches 286, 287 that are disposed on handle 201 for activation by a finger and/or thumb of the hand holding handle 201. These features save time and effort, improve accuracy, and improve safety.

Control module 203 and velocity sensing module 401 are electronic modules have various capabilities, including wireless data transmission and voice transmission, that allow them to be used in other applications. Alternatively, modules 203 and 401 may communicate via a connecting wire.

Figure 6:
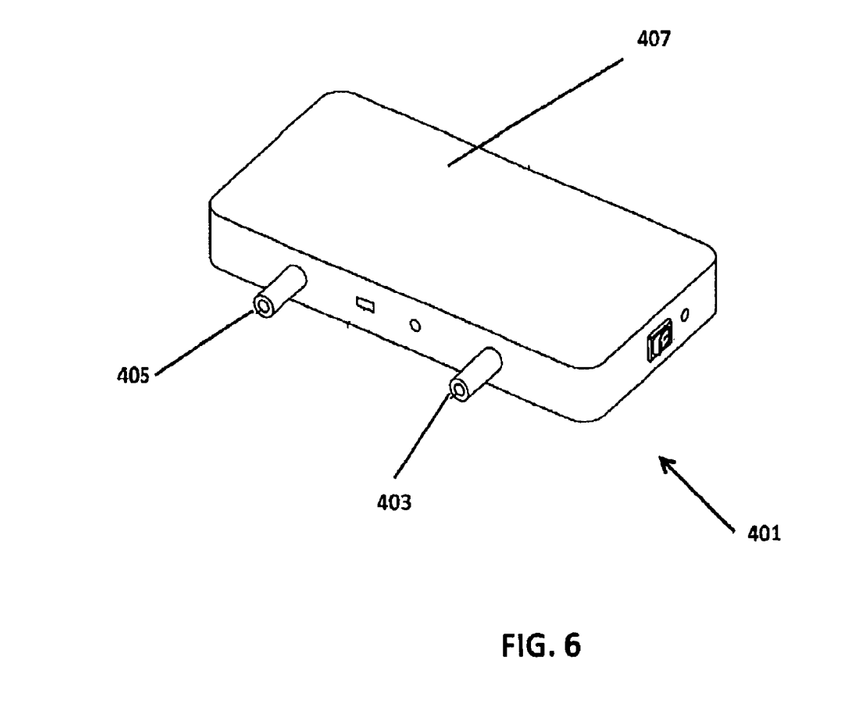
FIG. 6 illustrates the velocity sensing module of FIG. 2 in greater detail.

FIG. 6 illustrates velocity sensing module 401. Velocity sensing module 401 comprises total pressure inlet port 403 and static pressure inlet port 405. Inlet ports 403, 405 are connected to a network of valves, sensors, and tubing as described below.

Velocity sensor module 401 comprises an enclosure 407, containing a circuit board with RF transceiver module, one or more status LED's, and a battery. One or more microcontrollers are programmed to control the LED indicator(s), power on and power-off sequences, battery power monitoring, and sensor interface. Velocity sensor module 401 uses lithium batteries which may or may not be rechargeable. In the case of rechargeable batteries, a port is provided for attaching to an external power source.

Figure 7:
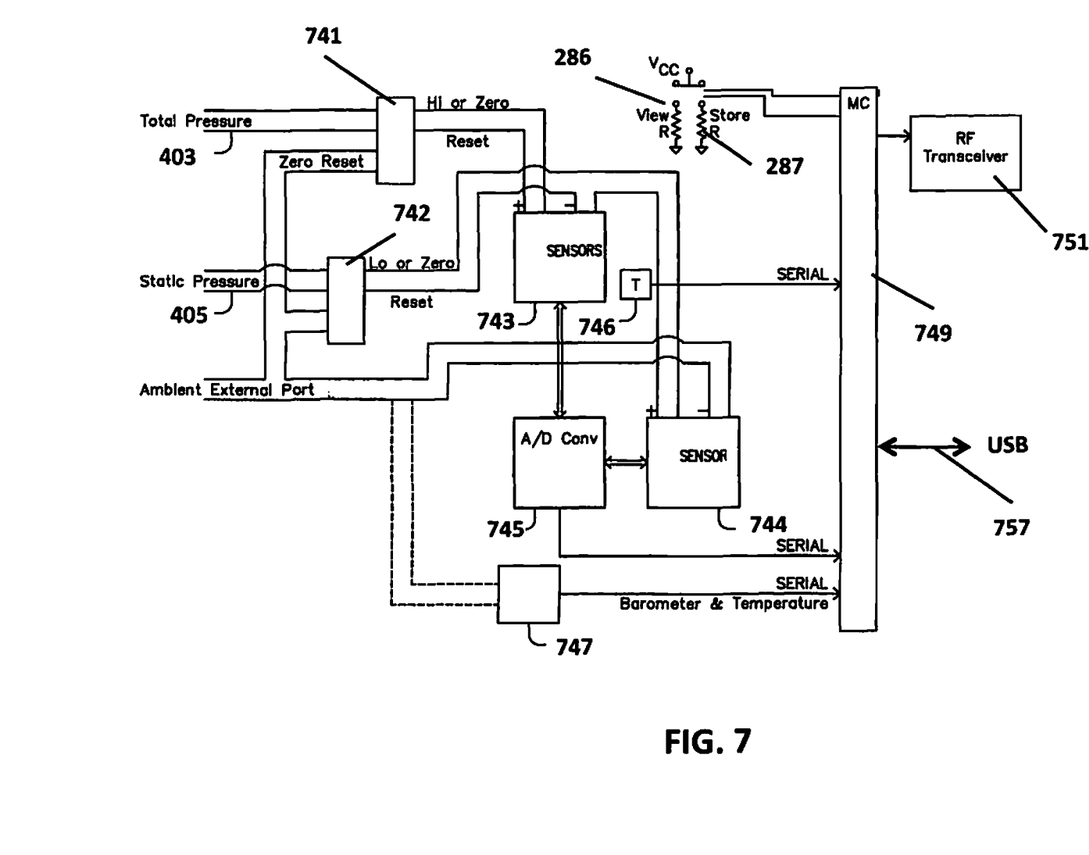
FIG. 7 is a block diagram of the velocity sensing module of FIG. 4.

FIG. 7 illustrates a block diagram of the velocity sensing module 401. Two valves 741 and 742 control the source of pressures presented to two pressure sensors 743 and 744. Control signals generated by a microcontroller 749 allow differential pressure sensor 743 to measure velocity pressure while differential pressure sensor 744 measures static pressure. Microcontroller 749 is a commercially available microcontroller and includes both a microprocessor and memory.

Microcontroller 749 is programmed to control valves 741, 742 in such a way that the proper pressure is applied to pressure sensors 743, 744. This allows the measurement of Total Pressure, Static Pressure, or Velocity Pressure, as required by the operation in progress at any time. Microcontroller 749 also programs a regular zero reset phase, which connects the sensor inlet ports to each other for occasional zero offset.

Pressure sensors 743 and 744 are commercially available solid state sensors. Each sensor 743, 744 has two piezoresistive elements mounted at an angle to each other in such a way that they avoid virtually all position sensitivity. Rotation relative to the gravitational field will not affect the measurement. Even more important in this application is that sensors of this type have low zero drift and do not need to be re-zeroed before every reading, as do many pressure sensors, which wastes time. This feature in turn allows the sensing electronics to make multiple rapid measurements in succession, accurately. Barometric pressure sensor 747 measures barometric pressure as well as module temperature. Pressure sensors 743, 744 have outputs which vary depending on the temperature of the element, so the sensors are characterized individually to determine correction factors related to temperature. A temperature sensor 746 is in close proximity to pressure sensors 743, 744, so that their outputs for a particular pressure input can be accurately predicted.

Velocity sensing module 401 measures barometric pressure and transmits the measurement to control module 203. Control module 203 calculates air density from the two inputs of temperature and barometric pressure.

Velocity sensing module 401 has the ability to make 100 pressure measurements per second and to statistically analyze the results in terms of running average, maximum, minimum, and standard deviation of the results. In turn, these data allow the user to know and understand the condition of the air in the duct in great detail.

Velocity sensing module 401 has control inputs coupled to switches 286, 287 such that the user by operating momentary switches 286, 287 can control storage of measurement data into memory of microcontroller 749 and/or display of measurement data.

Velocity sensing module 401 includes a standard port 757 for battery charging and for uploading stored measurements to a PC spreadsheet. In the embodiment, the standard port is a mini-USB port.

In the embodiment shown, velocity sensing module 401 includes a radio frequency transceiver 751 to provide wireless communication with control module 203. In other embodiments, wired communication may be provided between velocity sensing module 401 and control module 203.

The measurements from velocity sensing module 401 are transmitted to control module 203. Control module 203 includes both control inputs and a display. Control module 203 displays the current reading and the statistics of a given sequence of readings, including average, maximum, and minimum.

Figure 8A:
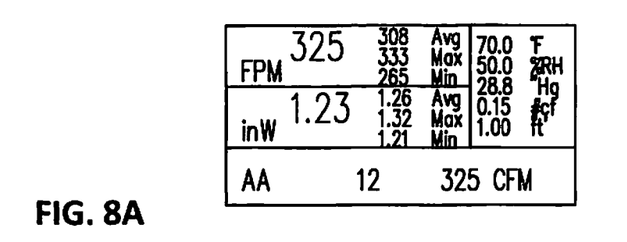
FIGS. 8A, 8B, and 8C illustrate representative display formats.
Figure 8B:
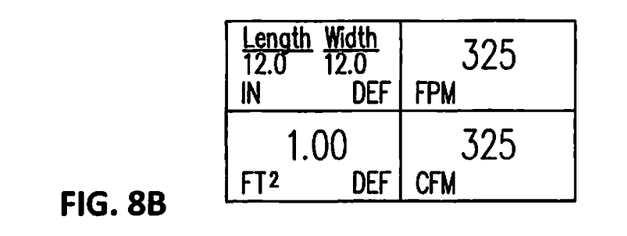
Figure 8C:
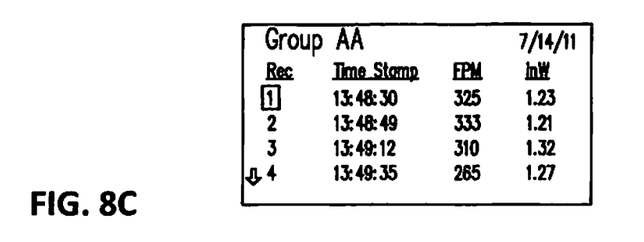

FIGS. 8A, 8B, 8C illustrate exemplary display formats available at control module 203. The display formats convey the air temperature, humidity (if desired), static pressure, density, and velocity. If the user wishes, the user can input the size of the duct, and control module 110 will automatically display the calculated airflow in CFM.

Figure 9:
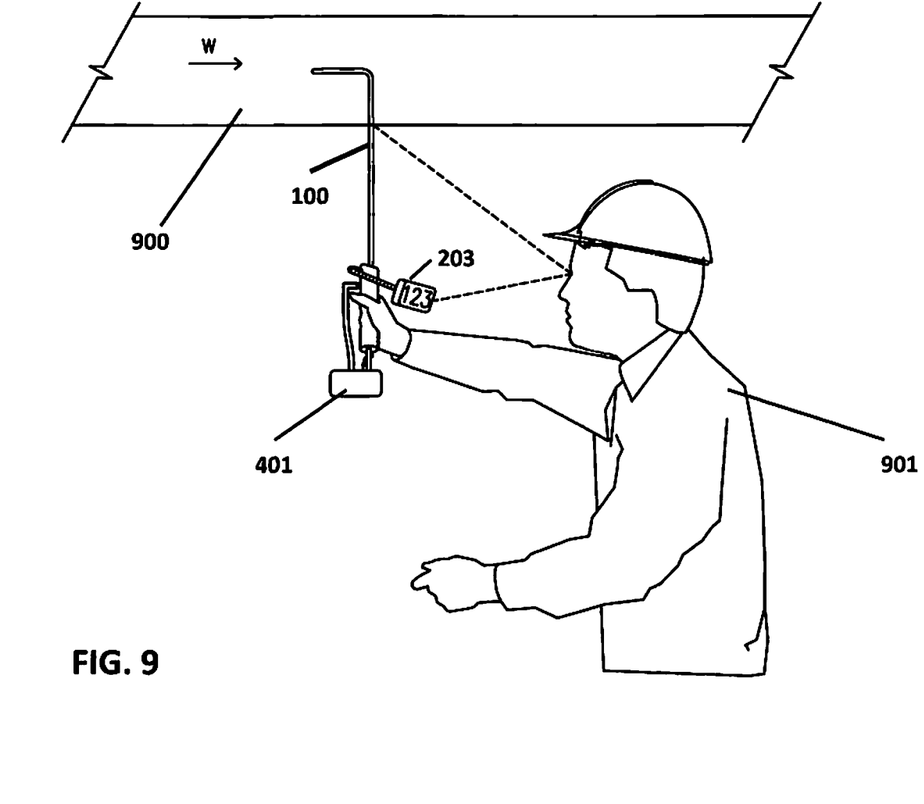
FIG. 9 illustrates the apparatus of FIG. 2 in use.

Velocity sensing module 401 has the ability to not only make 100 pressure measurements per second but it also has the ability to statistically analyze the results in terms of running average, maximum, minimum, and standard deviation of the results. In turn, these data allow the user to know and understand the condition of the air in the duct in great detail FIG. 9 illustrates the convenience of utilizing apparatus 200. A user 901 taking air flow measurements in a duct 900 is able to hold and control apparatus 200 in one hand while both sighting the position of Pitot tube 100 in duct 900 while observing measurement results on display 200.

Pitot tube 100 is inserted through a hole in the wall of duct 900. Velocity sensor module 401 captures measurements. The measured values are transmitted to control module 201, which calculates and displays all of the results of interest to user 901. With the embodiment, user 901 is able to perform a velocity traverse while using only one hand, allowing the other hand to be available for holding another tool or for grasping a fixed object for bracing and safety.

Figure 10:
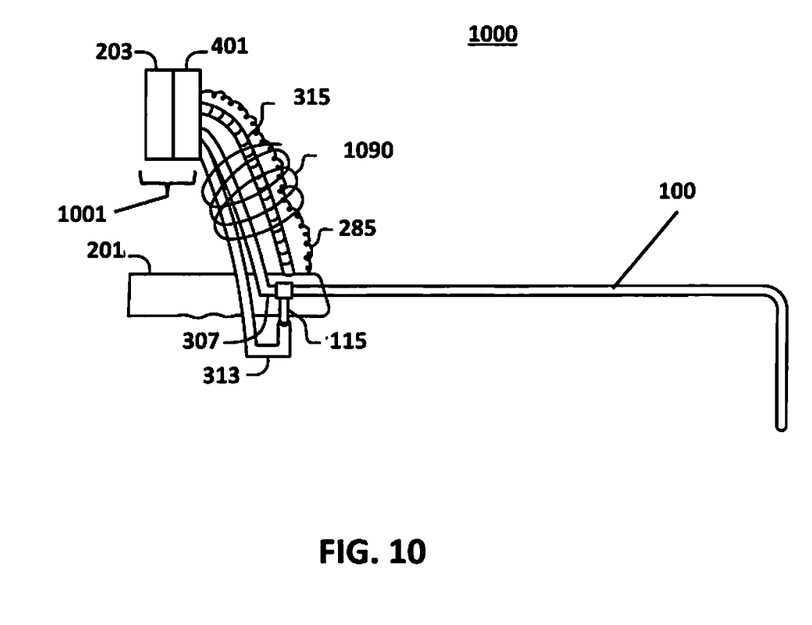
FIG. 10 illustrates a second embodiment.

Turning now to FIG. 10, a second embodiment 1000 combines the functions of control module 203 and velocity sensing module 401 into a control and sensing module 1001. Control module 203 and velocity sensing module 130 are combined or placed back-to-back and mounted on a support arm 315. Tubes 307, 313 are arranged along support arm 315 to conduct total and static pressure to sensors 743, 744 via valves 741, 742. Cable 285 from switches 286 and 287 is also arranged along support arm 315. A sheath 1090 may be employed to keep tubes 307, 313 and cable 285 neatly restrained along the support arm 315.

In a further embodiment, support arm 315 may be hollow, and may contain tubes 307, 313 and cable 285 within it to conduct them neatly from handle 201 to control module 203 and sensing module 401.

In yet a further embodiment, modules 203 and 401 may be integrated into one module.

Control module 401 may establish and maintains a network to communicate with velocity sensing module 401 and with one or more temperature sensing modules. Control module 401 may also have other functions, including display and storage of measurement data. Control module 401 is selectively controlled via various input devices including, but not limited to: keys, buttons, and/or switches. Control module 401 may also execute certain commands which are entered by user 901 via buttons, keys, or switches. Control module 401 may also execute certain commands which are entered by via microphone or thumb switch, allowing the user 901 to use his hand for something else and facilitating high productivity and safety.

It is desirable to determine how stable and how constant the velocity and flow is in duct 900. There may be surges of air in the duct system that occur cyclically due to fan speed variation, VAV operation, or other events. The user 901 may need to take action to prevent such surges.

Using system 200 it can be determined if the measured velocities and airflow is quite steady. Rapid measurements of velocity allow the user the option of taking many more measurements than prescribed by the standard traverse rules. A much more accurate average velocity may be obtained than would be the case if the sample size was limited to the standard number.

Figure 11:
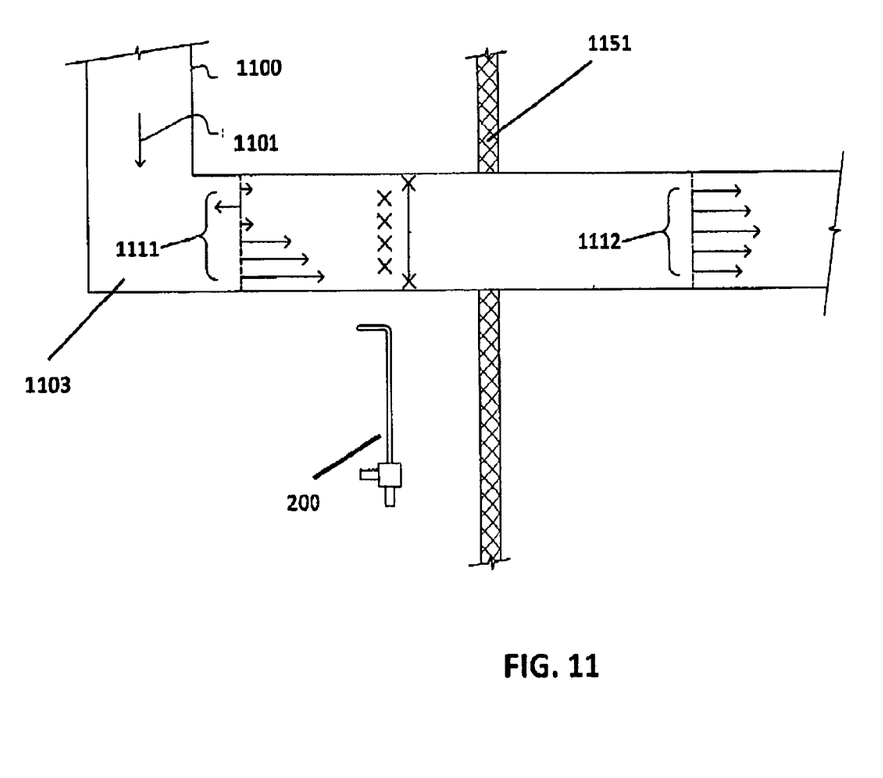
FIG. 11 illustrates air flow in a duct.

Turning now to FIG. 11, duct 1110 carries airflow 1101 which must turn 90 degrees abruptly at corner or bend 1103. Bend 1103 causes turbulence and eddies, which result in the air velocity vectors 1111. In conditions such as these, it is difficult using prior art arrangements to achieve an accurate average velocity with conventional meters and standard procedures, which are designed for the velocity vector profile at location 1112, which usually develops after an extended distance of airflow down a straight duct with no obstructions or size changes.

It is often the case that a wall 1151 or other obstruction prevents the air balancer from performing a traverse where a standard profile exists such as shown at location 1112, and a traverse at a location such as 1111 must be performed. If a standard matrix requiring four measurements per drilled hole is used at location 1111, the average will not be correct.

System 200 can easily take hundreds or thousands of measurements across the duct and the average of the readings will much more accurately represent the true average. Conventional meters require between one and six seconds per measurement. System 200 allows the user to take up to 100 measurements per second.

Figure 12:
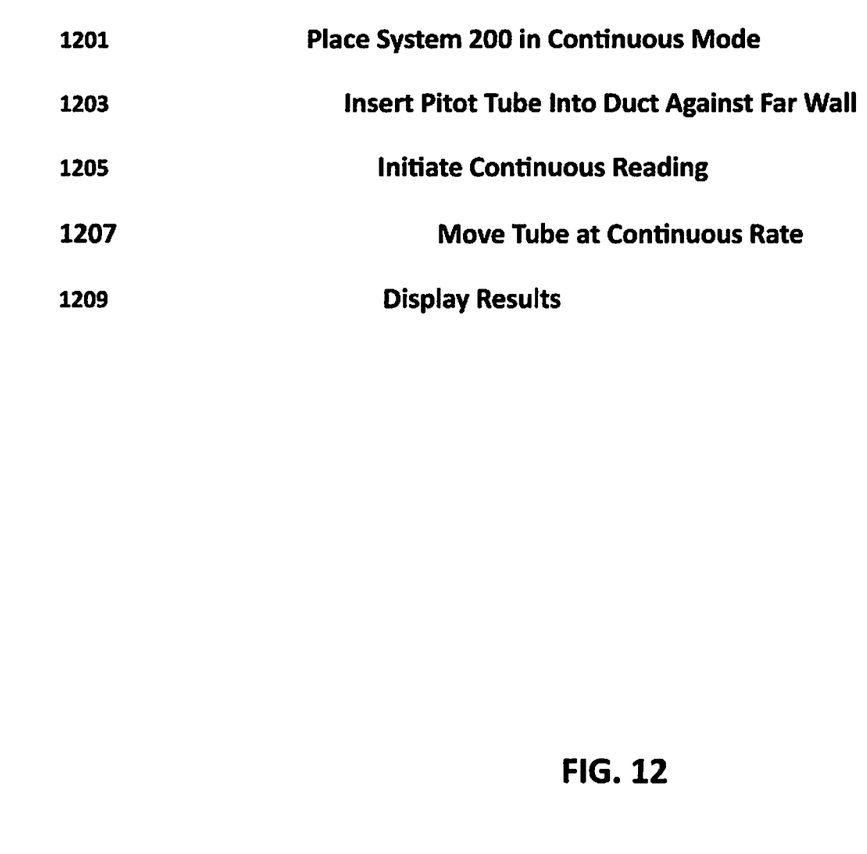
FIG. 12 illustrates a method.

Turning now to FIG. 12 a method of measuring a multitude air velocities at a duct cross-section utilizing system 200 is illustrated. At step 1201 system 200 is placed into a continuous measurement mode via switches 286, 287 on handle 200. At step 1203 Pitot tube 100 is inserted into duct 1110 and Pitot tube portion 101 is positioned against the far duct wall 1111. The automatic continuous reading operation is initiated at step 1205. After the automatic continuous reading operation is initiated, Pitot tube 100 is withdrawn at a steady rate, e.g., one inch per second, at step 1207. Pitot tube 100 is marked every inch facilitating withdrawal at a steady rate. When Pitot tube portion 101 reaches lower duct wall 1113 the user stops the continuous measuring mode of system 200 via switches 286, 287. At step 1209 control module 201 may display the number of measurements made and the average, minimum, and maximum.

The present invention has been described above with reference to a number of exemplary embodiments and examples. It will be appreciated by those skilled in the art that the particular embodiments shown and described herein are illustrative of the invention and its best mode and are not intended to limit in any way the scope of the invention as set forth in the claims. It will also be appreciated by those skilled in the art that various changes and modifications may be made to the embodiments without departing from the scope of the present invention. These and other changes or modifications are intended to be included within the scope of the present invention, as expressed in the following claims.

The invention claimed is:

1. Apparatus to measure air velocity in an air handling system, said apparatus comprising:
   a Pitot tube for insertion into a duct, said Pitot tube comprising a total pressure tube having a total pressure tube outlet, and a static tube having a static tube outlet; and
   a module having a first inlet coupled to said total pressure tube outlet and a second inlet coupled to said static tube outlet, said module operable to concurrently measure air velocity pressure and air static pressure in said duct;
   carrying apparatus to carry said Pitot tube and said module;
   said Pitot tube, said module and said carrying apparatus arranged to provide a unitary measuring unit;
   said carrying apparatus is operable to position said Pitot Tube in a duct of said air handling system to measure velocity pressure and static pressure;
   said module is operative to automatically, concurrently measure air velocity pressure and air static pressure.

2. Apparatus in accordance with claim 1, wherein:
   said carrying apparatus operable to position said Pitot tube at a plurality of positions within said duct.

3. Apparatus in accordance with claim 2, comprising:
   said module is operative to automatically, concurrently measure air velocity pressure and air static pressure at predetermined time intervals.

4. Apparatus in accordance with claim 1, wherein:
   said module is operative to concurrently measure air velocity pressure and air static pressure at up to 100 measurements per second.

5. Apparatus in accordance with claim 1, wherein:
   said module comprises at least one processor to perform predetermined calculations utilizing said air velocity pressure and air static pressure measurements.

6. Apparatus in accordance with claim 5, wherein:
   said module comprises a memory; and
   said processor stores calculated results in said memory.

7. Apparatus in accordance with claim 6, comprising:
   a display; and
   said processor is operable to display predetermined ones of said calculated results on said display.

8. Apparatus in accordance with claim 7, wherein:
   said module is operative to automatically concurrently measure air velocity pressure and air static pressure at predetermined time intervals.

9. Apparatus in accordance with claim 8, comprising:
   said time intervals are selected to provide a duct traverse.

10. Apparatus in accordance with claim 9, comprising:
    said module is operable to automatically calculate average air velocity.

11. Apparatus in accordance with claim 10, comprising:
    said module is operable to calculate corresponding airflow volume.

12. Apparatus in accordance with claim 1, comprising:
    said carrying apparatus is operable to position said Pitot Tube proximate a far wall of said duct and said carrying apparatus is operable to withdraw said Pitot tube at a predetermined steady rate to traverse said duct.

13. Apparatus in accordance with claim 12, wherein:
    said module is operative to automatically concurrently measure air velocity pressure and air static pressure at predetermined time intervals while said carrying apparatus withdraws said Pitot tube to traverse said duct at a predetermined steady rate.

14. A method to measure air velocity in an air handling system, said method comprising:
    providing measuring apparatus comprising: a Pitot tube for insertion into a duct, said Pitot tube comprising a total pressure tube having a total pressure tube outlet, and a static tube having a static tube outlet; a module having a first inlet coupled to said total pressure tube outlet and a second inlet coupled to said static tube outlet, said module operable to concurrently measure air velocity pressure and air static pressure in said duct; carrying apparatus to carry said Pitot tube and said module; said Pitot tube, said module and said carrying apparatus arranged to provide a unitary measuring unit;
    utilizing said carrying apparatus to position said Pitot Tube in a duct of said air handling system to measure velocity pressure and static pressure;
    operating said module to automatically, concurrently measure air velocity pressure and air static pressure.

15. A method in accordance with claim 14, comprising:
    utilizing said carrying apparatus to position said Pitot tube at a plurality of positions within said duct.

16. A method in accordance with claim 15, comprising:
    automatically, concurrently measuring air velocity pressure and air static pressure at predetermined time intervals.

17. A method in accordance with claim 14, comprising:
    operating said module to concurrently measure air velocity pressure and air static pressure at up to 100 measurements per second.

18. A method in accordance with claim 14, wherein:
utilizing said module to perform predetermined calculations utilizing said air velocity pressure and air static pressure measurements to provide calculated result.
19. A method in accordance with claim 18, wherein:
storing said calculated results in said module.
20. A method in accordance with claim 19, comprising:
providing a display; and
displaying predetermined ones of said calculated results on said display.
21. A method in accordance with claim 20, comprising:
automatically concurrently measuring air velocity pressure and air static pressure at predetermined time intervals.
22. Apparatus in accordance with claim 21, comprising:
selecting said time intervals to provide a duct traverse.
23. Apparatus in accordance with claim 14, comprising:
utilizing said carrying apparatus to position said Pitot Tube proximate a far wall of said duct; and
utilizing said carrying apparatus to withdraw said Pitot tube at a predetermined steady rate to traverse said duct.
24. A method in accordance with claim 23, comprising:
automatically concurrently measuring air velocity pressure and air static pressure at predetermined time intervals while said operating said carrying apparatus to withdraw said Pitot tube at a predetermined steady rate from said duct.
25. A method in accordance with claim 24, comprising:
calculating at least one of average, minimum and maximum measurements from said air velocity pressure and air static pressure measurements.
26. A method in accordance with claim 23, comprising:
displaying said calculated at least one of average, minimum and maximum measurements.

* * * * *